United States Patent [19]

Kiser

[11] Patent Number: 5,290,200
[45] Date of Patent: Mar. 1, 1994

[54] DETECTION AND EVACUATION OF ATMOSPHERIC POLLUTANTS FROM A CONFINED WORK PLACE

[75] Inventor: Thomas E. Kiser, Fremont, Ohio
[73] Assignee: Professional Supply, Inc., Fremont, Ohio
[21] Appl. No.: 665,352
[22] Filed: Mar. 6, 1991
[51] Int. Cl.⁵ .................................................. F24F 7/007
[52] U.S. Cl. ................................................ 454/229; 454/238
[58] Field of Search .................. 364/505, 506; 454/49, 454/229, 236, 238, 255, 340

[56] References Cited

U.S. PATENT DOCUMENTS 4,905,578 3/1990 Curtis et al. ..................... 454/228 X
4,960,041 10/1990 Kiser ............................... 454/229 X

FOREIGN PATENT DOCUMENTS 95327 6/1984 Japan ................................. 454/238
131131 6/1987 Japan ................................. 454/236

Primary Examiner—Harold Joyce
Attorney, Agent, or Firm—Marshall & Melhorn

[57] ABSTRACT

A system for maintaining atmospheric conditions in an enclosed building within desired parameters and rapidly evacuating abnormally high amounts of airborne pollutants from localized areas of the building. Conditioned air, including sufficient outside air, is continuously admitted to the building interior from a plurality of air handling units disposed about the building to maintain the interior of the building under a slight positive pressure throughout. The air handling units, at least in areas where concentrations of airborne contaminants are generated include, in addition to outside air and building air inlets and a building air outlet, an outlet exhausting to the outside. Sensors and/or scanning units located throughout the building monitor various atmospheric conditions and transmit signals indicative of the noted conditions to a central computer. The computer, in turn, compares the observed conditions to predetermined desired conditions and controls the air handling units as necessary to maintain the conditions within desired parameters. When an abnormal airborne pollutant condition is noted in a particular area, the outside air inlet and building air outlets are closed and the building return air inlet and exhaust outlet are opened so that contaminated air is withdrawn from the region and exhausted to the outside.

8 Claims, 2 Drawing Sheets

DETECTION AND EVACUATION OF ATMOSPHERIC POLLUTANTS FROM A CONFINED WORK PLACE

BACKGROUND OF THE INVENTION

1. Field of the Invention

The present invention pertains broadly to control of atmospheric conditions within an enclosed space, and move particularly to detection of hygienically offensive and/or hazardous atmospheric conditions within an enclosed work place, and rapid evacuation of the offensive or hazardous atmosphere and replacement with atmosphere of suitable quality. Potentially offensive or hazardous conditions are detected and corrective measures are implemented so as to maintain the enclosed atmosphere within predetermined hygienic parameters.

2. Description of the Prior Art

Until recently industrial-type buildings, that is, large buildings having a generally open interior within which manufacturing processes are carried on, were generally heated from a central heating plant, with ducts or pipes delivering heated air, steam or a suitable liquid from the heating plant as a heat carrying medium for distributing heat to various areas of the building. Cooling, if it was available, was likewise provided by delivering cooled air from a central unit through duct work to specific discharge areas. More than likely, any attempt at cooling involved merely opening doors and windows to allow random fresh air circulation, perhaps augmented by the use of numerous exhaust fans and fans directing air toward workers. Air quality was not deemed of great significance, and if working conditions became intolerable, an attempt was made to extract stale or polluted air by means of exhaust fans through vents in the roof or side walls. There was little or no correlation between the heating or cooling and the ventilation, and no monitoring to assure that air quality was maintained within environmentally and hygienically safe predetermined parameters.

More recently, direct-fired space heating units have come into use for heating relatively large industrial type buildings. Such units are generally disposed exteriorly of the building as on the roof or along the side walls, and include a cabinet housing a burner and a fan. The fan draws fresh air from the outside, as well as return air from the interior of the building. During periods when heat is required for the building, a portion of the fresh air is drawn over the burner to be heated, and the remaining fresh air is mixed with recirculated building air in selected proportions. The heated and unheated air are combined downstream from the burner and discharged into the building to maintain the building interior at a desired temperature and pressure. Where cooling is to be provided for the building, an appropriate heat exchange unit may likewise be provided in association with the cabinet for conditioning the air prior to discharge into the building.

Such units purportedly maintain temperature and pressure at desired levels by altering, on demand, the complementary proportions of outside air and recirculated building air passing through the unit or units for discharge into the building. No duct work is employed, and once the air is discharged into the building its movement is randomly influenced by various factors such as building infiltration, exfiltration, convection currents, heat producing activities in various areas of the building, outside wind direction and velocity, air density differentials, and ventilation systems. Thus, while the space heating or air handling units themselves may function as intended, their operation often results in objectionable and uncontrollable hot or cold areas within the building. They also are not effective in removing airborne pollutants and contaminants or controlling humidity in localized areas of the building so as to maintain air quality throughout the building within current environmentally acceptable standards.

In order to overcome these shortcomings of the prior art, a system for regulation of atmospheric conditions within a confined space has been devised as described in commonly assigned U.S. Pat. Nos. 4,850,264 and 4,960,041, the disclosures of which are herein incorporated by reference. In accordance with the inventions as fully described in the aforementioned patents, a so-called global control concept is utilized wherein the building interior defines an essentially enclosed system, with sufficient outside air being admitted through air handling units positioned about the building to continuously maintain the interior of the building under a slight positive pressure throughout relative to outside atmospheric pressure. Controllable vents are provided at strategic locations around the perimeter of the building, and sensing units are located throughout the building interior to monitor atmospheric conditions such as temperature, humidity and the level of particulates and pollutants. The sensing units or monitoring stations generate signals indicative of the readings for transmittal to a central computer. The central computer periodically monitors the signals from each sensing unit and compares them to stored data representing desired parameters for the atmospheric conditions in the various zones monitored by the sensors. Signals are generated in response to noted deviations from the prescribed parameters, and the signals are utilized to regulate the controllable vents and the air handling units so as to modify the incoming air and/or cause air to be expelled through an appropriate vent or vents in the area of the monitoring station or stations until atmospheric conditions again fall within the prescribed parameters. Operation of the various air handling units and vents is correlated so that air delivered from the air handling units migrates to specified areas in a controlled manner without the use of duct work to restore and/or maintain atmospheric conditions throughout the building within the prescribed parameters.

The aforedescribed system has been found extremely effective in maintaining atmospheric conditions within desired parameters in most facilities. However, in certain facilities housing production operations which periodically generate and emit abnormally high amounts of airborne contaminants, it has been found that the capability to quickly provide, on demand, accelerated evacuation of such contaminants from particular areas would be highly advantageous. By way of example, such facilities might include those which house foundry activities, welding areas, rubber vulcanizing operations and the like.

SUMMARY OF THE INVENTION

To that end, there is provided in accordance with the present invention an improved system for use in regulating the atmospheric conditions within industrial-type buildings as disclosed in the aforementioned U.S. patents. More particularly, conditioned air, including sufficient outside air, is continuously admitted to the building interior from a plurality of air handling units disposed about the building to maintain the interior of the building under a slight positive pressure throughout, that is, at a pressure slightly greater than the surrounding outside atmosphere. The air handling units, at least those associated with areas of the building housing operations which may periodically generate significant amounts of airborne contaminants include, in addition to the conventional outside air and building return air inlets and the outlet to the building interior, a so-called dump-mode outlet exhausting to the outside. Functionally interconnected louvers are provided for the inlets and outlets whereby upon command, the outside air inlet and building air outlet can be closed and the building return air inlet and dump mode outlet opened for controlled accelerated evacuation of contaminants from the area.

Sensors are strategically located throughout the building for monitoring various atmospheric conditions such as temperature, humidity, air pressure and the presence of various pollutants. In addition, scanning units may be provided for detecting the level of visible contaminants in the atmosphere of selected locations. The sensors and scanning units generate signals indicative of their readings for transmittal to a central computer. The computer monitors the signals from each sensor and scanning unit and compares them to stored data representing desired parameters for the atmospheric conditions in the various zones monitored by the sensors and scanning units. The air handling units and perimeter relief dampers are adapted to be individually regulated by signals from the central computer. Thus, when a trend for a pressure, temperature or atmospheric condition to fall outside the predetermined parameter in a particular zone is noted, the computer sends a signal appropriately adjusting the air handling unit or units and relief dampers associated with that zone to implement corrective action.

In addition, should an atmospheric condition or trend toward such a condition be noted that is not capable of being corrected within a prescribed time by normal operation of the system, the computer will initiate a sequence of steps placing certain of the air handling units in dump mode, or accelerated evacuation posture. In that posture, one or more appropriately located air handling units is set to evacuate contaminated air directly for dissipation in the outside atmosphere, while others of the air handling units are adjusted to increase their admission of fresh outside air so as to maintain the positive pressure throughout the building interior. When the sensors and/or scanning units indicate that the atmospheric condition again falls within the predetermined parameter, the computer initiates a sequence of steps returning the system to normal operation.

BRIEF DESCRIPTION OF THE DRAWINGS

In the drawings, wherein like numerals refer to like parts throughout.

DESCRIPTION OF THE PREFERRED EMBODIMENTS

Figure 1:
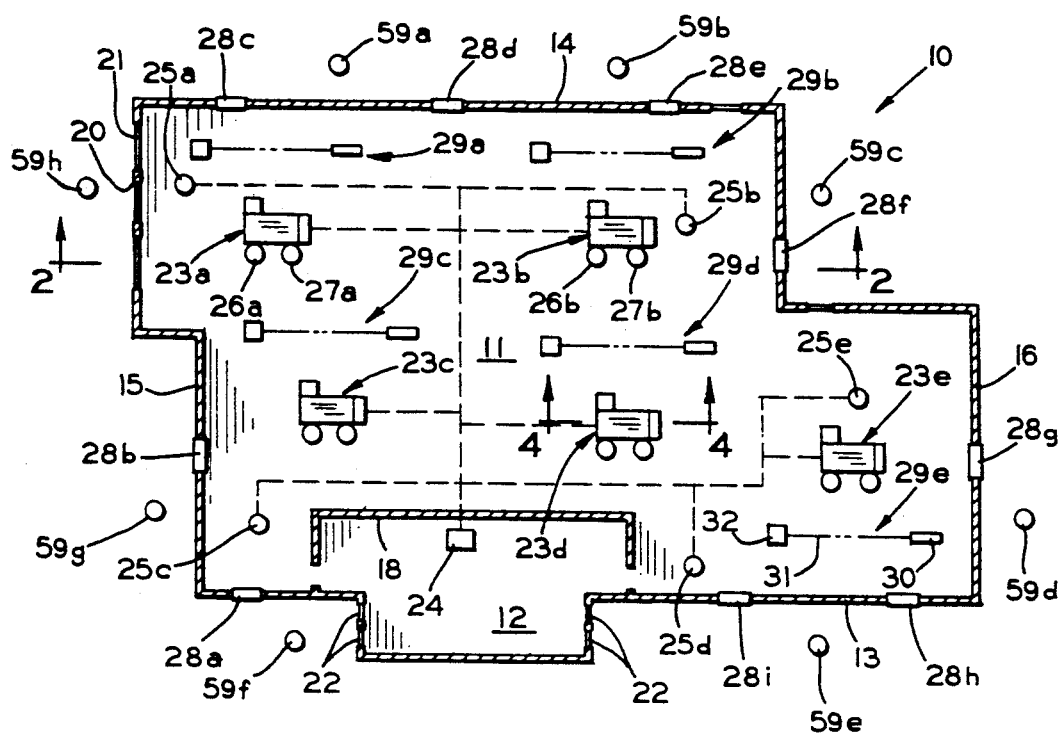
FIG. 1 is a schematic plan view of an industrial-type building embodying the invention.

With reference now to the drawings, and particularly to FIG. 1, there is illustrated generally at 10 a conventional industrial type building embodying the invention. It will be understood that the illustrated building is merely typical of such buildings for housing industrial plants, warehouses and the like, and that buildings of various configurations and widely varying sizes, ranging from a few thousand square feet to hundreds of thousands of square feet or more, may advantageously employ the invention. Such buildings typically include a large open area 11 in which manufacturing, assembling, warehousing or commercial activities are conducted. A smaller, enclosed area 12 may be provided for office or administrative activities.

The building 10 generally comprises front and rear walls 13 and 14, respectively, interconnected by oppositely disposed end walls 15 and 16. A roof 17 (FIG. 2), generally of relatively flat construction, covers the open area of the building and may extend over the enclosed area 12 as well. The enclosed area may extend into the main portion of the building and be separated from the open area 11 as by an interior wall 18 and a suitable ceiling structure (not shown). Various types of openings may be provided in the walls to provide access to the building. Thus, the building may include a loading dock area 19 provided with one or more large doorways 20 adapted to accommodate trucks or railroad cars for receiving and shipping goods. Closure members such as retractable overhead doors 21 are provided for the doorways. The building may additionally include conventional doors 22 at various locations for providing access by workers, as well as windows (not shown) for admitting light.

In order to pressurize the building interior in accordance with the aforementioned global control concept, there is located on the roof 17 of the building a number of air handling units 23 adapted to direct conditioned air into the interior of the building. As illustrated in FIG. 1 five such units, designated 23a through 23e are located on the roof and positioned so as to assure delivery of conditioned air from the units to all areas of the building as well as to be capable of rapidly evacuating contaminated atmosphere from those areas in which activities carried on therewithin are liable to periodically generate excess amounts of contaminants. In the embodiment illustrated in FIG. 1, each of the air handling units 23a through 23e is capable of such rapid evacuation, that is, of being operated in a so-called dump mode. However, as will be readily appreciated, in facilities where such activities are confined to a specific area or areas within the building, it may only be necessary to employ the dump mode air handling units in those areas. The individual air handling units 23 are linked to and suitably controlled by a central computer 24 located as in the enclosed office or administrative area 12.

In accordance with the global control feature as set forth in the aforementioned U.S. patents, there is provided at strategic locations throughout the building 10 a series of pressure sensors 25 for monitoring the atmospheric pressure at their various locations and generating a signal for transmission to the central computer indicative of the current atmospheric pressure at each location. There may also be strategically located throughout the building and similarly linked to the central computer, additional sensors for measuring other atmospheric conditions such as temperature, humidity and pollutant levels. Such additional sensors may, for example, comprise a series of temperature sensors 26a through 26e and air quality sensors 27a through 27e.

In order to selectively discharge air from the building for controlling air movement within the building, adjustable relief dampers 28 are provided in the walls 13, 14, 15, and 16 at spaced intervals around the perimeter of the building as shown at 28a through 28i. The system is entirely capable of maintaining atmospheric conditions in the building within desired parameters under normal operating conditions by controllably expelling atmosphere through the relief dampers. However, as heretofore explained, in buildings wherein functions are carried on which at least periodically generate unusually high amounts of pollutants, and particularly visible pollutants, in certain areas of the building, the capability of quickly detecting and extracting or expelling such pollutants from a localized area is very beneficial.

Figure 2:
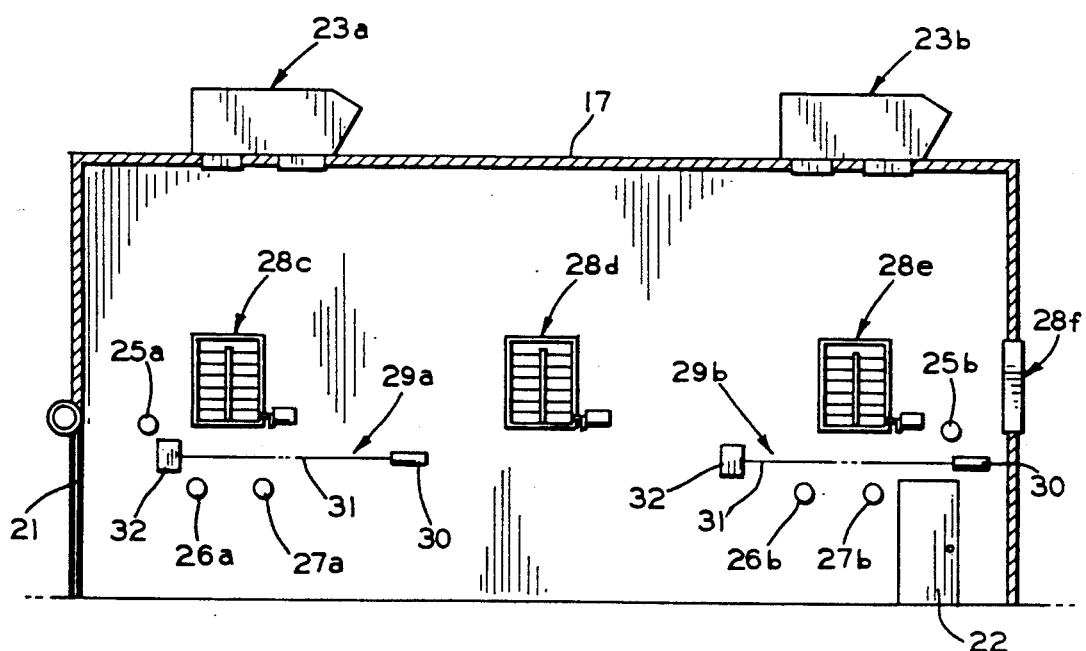
FIG. 2 is a vertical section taken substantially along line 2—2 of FIG. 1.

To that end, devices for monitoring the building atmosphere for the presence of visible airborne pollutants are provided. In order to provide for a quick reaction to generation of such visible pollutants over an extended area, monitoring devices are preferably of a scanning type emitting a signal which is affected by the presence of particulates in the atmosphere. As illustrated in FIGS. 1 and 2, monitoring devices shown generally at 29 may include a light source 30 such as a laser source, emitting a beam 30 which is intercepted by a photodetector 32. The intensity of the beam is affected by the airborne pollutants, and when the pollutants reach a predetermined level the photodetector will generate a signal which is transmitted to the central computer for initiating corrective measures as will be hereinafter described. It is contemplated that the monitoring devices may as well be a type emitting a high frequency radio signal and monitoring the signal as reflected by the airborne pollutants for determining pollutant levels. In any event, it is important that the monitoring device be capable of detecting the contaminant level within an extended area and not merely at a single point as with conventional smoke detector type devices. As illustrated in FIG. 1 a monitoring device 29, identified at 29a through 29e, is positioned in the area of each air handling unit 23. However, the devices may be positioned as deemed appropriate for monitoring the building interior and, as pointed out above, those areas which do not house pollutant-generating processes may not require such monitoring devices.

The air handling units 23 are of a unique construction particularly adapted to the invention and, as illustrated in FIG. 1, are positioned at suitable locations on the roof structure 17 so that when operated in conjunction with the global control system of the invention, they will readily supply adequate amounts of conditioned air for maintaining a positive pressure throughout the building. In addition, they provide for rapid evacuation of atmosphere from a particular area or particular areas of the building upon command, and a return to normal operation following evacuation of the substandard atmosphere. The units, during normal operation, deliver a composite of thermally conditioned outside air, raw outside air and recirculated indoor air into the building interior and modulate the proportions so as to deliver the composite air at a predetermined temperature and with a volume of outside air to maintain the desired pressurization within the building. Upon detection of an abnormal atmospheric condition in a particular area, which the system may be unable to quickly rectify in its normal operating mode, the pertinent air handling unit or units is placed in its dump mode configuration. Thus, the selected unit or units goes through a sequence of steps whereby it is converted from an air supply function to an atmosphere exhaust function.

Figure 4:
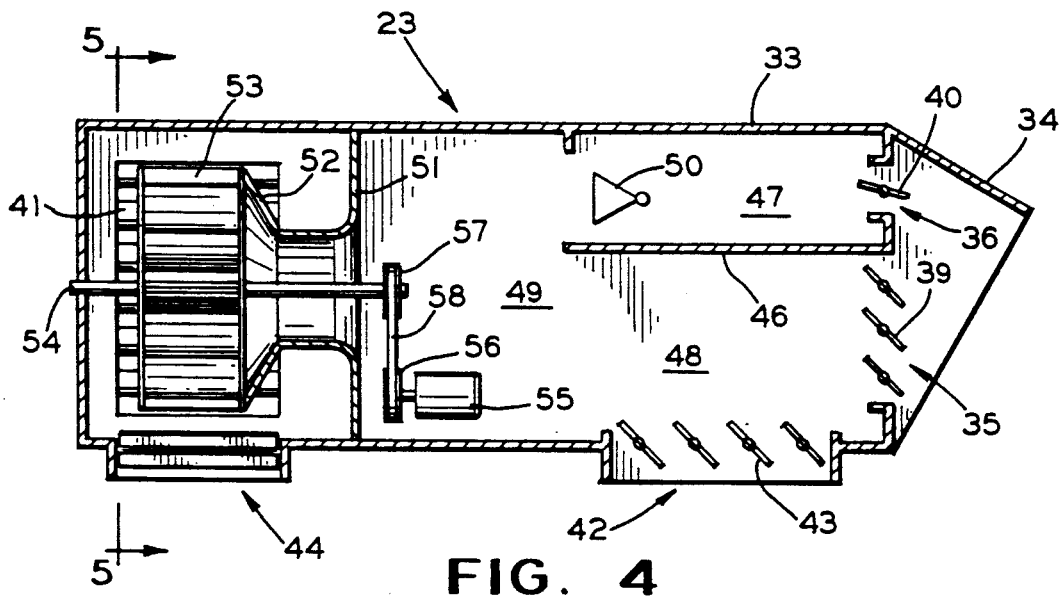
FIG. 4 is a vertical section taken substantially along line 4—4 of FIG. 1, through a dump mode air handling unit employed in the invention.
Figure 5:
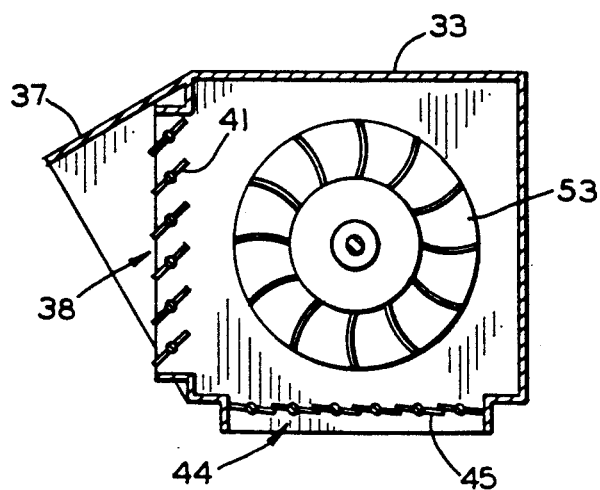
FIG. 5 is a vertical section taken substantially along line 5—5 of FIG. 4, and illustrating the dump mode outlet of the air handling unit.

Accordingly, the novel air handling units 23 in accordance with the invention, as best seen in FIGS. 4 and 5, comprise a box-like housing 33 of generally rectangular configuration having at one end a protective weather hood 34 enclosing first and second outside air inlet openings 35 and 36, respectively. At the opposite end and there is provided a protective side discharge hood 37 enclosing an exhaust outlet 38. The inlet openings 35 and 36 are provided with adjustable dampers 39 and 40, respectively, for regulating the flow of incoming outside air. The exhaust outlet 38 is likewise provided with an adjustable damper 41 for regulating the flow therethrough as will be hereinafter described. A building return air inlet 42 communicating with the interior of the building, includes an adjustable damper assembly 43 for regulating the flow of return air from the interior of the building to the air handling unit. An outlet 44 in the housing, which normally directs conditioned air from the unit into the building interior, is provided with an adjustable damper assembly 45 by which the outlet may be closed off while the unit is in the dump mode configuration as will be hereinafter described.

The flow path of the incoming air from the inlet opening 36 is separated from that of the inlet openings 35 and 42 by a partition wall 46 extending transversely between the side walls of the housing 33. The interior of the intake end of the housing thus essentially comprises three chambers, a first chamber 47 through which incoming air from the inlet opening 36 flows, a second chamber 48 through which incoming air from the second and third inlet openings 35 and 42 flows, and a third chamber 49 downstream wherein the flow from the first two chambers is combined. For normal operation the damper 39 in the inlet opening 35 is conventionally linked to operate in opposed fashion to the damper 43 in the return air inlet opening 42. Thus, as the damper 39 opens or closes to admit more or less outside air, the damper 43 correspondingly closes or opens to admit less or more return air, so that the flow of outside and return air complement one another to provide uniform flow through the second chamber.

There is located within the first chamber 47 and in the flow path from the air inlet opening 36 a heating unit 50, preferably a direct fired gas burner of the open flame type. Outside air drawn through the first chamber may thus be heated in passing through the chamber before entering the third chamber 49 for mixing with air from the chamber 48. It is contemplated that where appropriate, air filters may be incorporated in the chambers 47, 48 or 49 in the conventional manner for removing airborne particulates from the incoming air. Likewise, heat exchangers (not shown) may be conventionally incorporated in the air handling unit as within the chambers 47, 48 or 49 for appropriately cooling the air prior to admission to the building interior.

A bulkhead 51 and a fan shroud 52 are provided within the housing 33 for mounting an associated impeller wheel or blower 53. The impeller wheel is carried by a shaft 54 for rotation within the shroud 52 as by a suitable drive motor 55 having a pulley 56 drivingly coupled to a fan pulley 57 by a drive belt 58. The impeller wheel or blower 53 normally operates continuously at a constant velocity during operation of the system to draw air through the chamber 48 or chambers 47 and 48 and into the fan shroud for discharge from the housing 33 of the air handling unit through one or the other of the outlets 38 and 44. Operation of the dampers 39, 40, 41, 43, and 45, the burner 50, the impeller wheel 53 and the relief dampers 28 are all under the control of the central computer 24 as will be hereinafter described.

Figure 3:
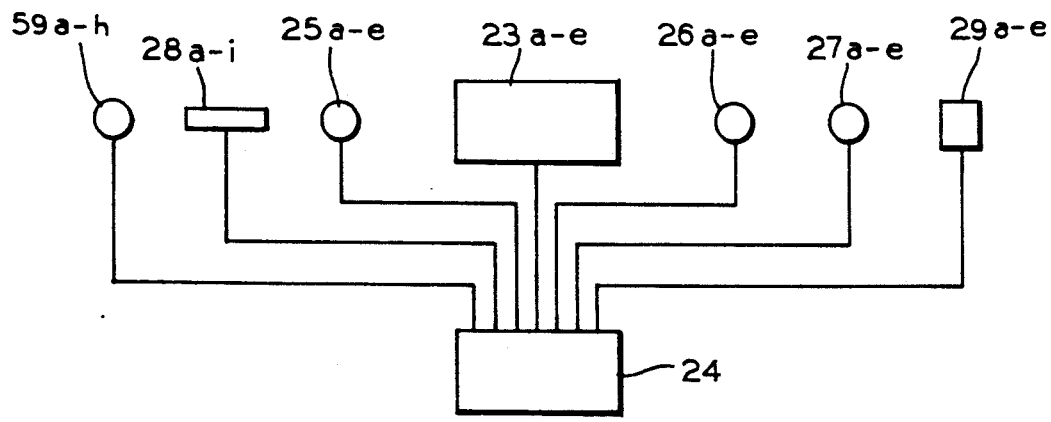
FIG. 3 is a diagram schematically illustrating the global control system of the invention.

As illustrated schematically in FIG. 3, the controls for the air handling units 23a through 23e and the relief dampers 28a through 28i, as well as the pressure sensors 25a through 25e, the temperature sensors 26a through 26e, the air quality sensors 27a through 27e and the monitoring devices 29a through 29e are all suitably operationally linked to the central computerized control unit 24 so as to be functionally interrelated. In operation, the control unit is programmed to periodically poll each of the sensors 25, 26 and 27 and the monitoring devices 28, and to receive a signal indicative of the current condition as noted by that sensor or monitor. The noted data is entered into the computer memory and the current conditions are compared to stored data representing the desired condition at that location, as well as to data indicative of conditions noted upon preceding observations. The polling is preferably repeated at frequent intervals in order to permit early detection of undesirable conditions and changing trends in the conditions. For example, the polling may be repeated at intervals of five seconds or less. When a condition is observed which falls outside predetermined limits, or an undesirable trend is indicated upon successive observations, the computerized control unit will initiate corrective measures with the appropriate air handling unit or units 23 and/or vent units 28.

In operating the system, it is important that a slight positive pressure be maintained throughout the interior of the building, that is, that the interior pressure be slightly greater than the outside atmospheric pressure around the perimeter of the building. To that end, external pressure sensors may be positioned at strategic locations around the exterior of the building as shown in FIG. 1, for example, at 59a through 59h. The sensors 59 are operatively coupled to the central computer 24 so as to provide signals indicative of the actual pressure at their various locations around the building. The computer then can compare the internal pressures noted by the sensors 25 to the actual external pressures noted by the external sensors 59 in controlling the various air handling units 23 and relief dampers 28. In accordance with another embodiment, a series of commercially available pressure transducers (not shown) may be positioned at selected locations around the peripheral walls of the building. Such transducers determine the pressure differential between the interior and exterior at their location and transmit a signal indicative of the difference to the central computer.

As indicated above, under normal operating conditions the system will operate as set forth fully in the abovementioned patents. Thus, the damper assembly 45 will remain fully open and the damper 41 will be fully closed to close off the exhaust outlet 38. The dampers 39 and 43 are interconnected to operate in opposed fashion, so that the incoming air drawn through the chamber 48 may consist entirely of outside air or entirely of building return air or any combination of the two, depending upon the positions of the dampers 39 and 43 as dictated by the computer 24. Outside air may also be drawn through the chamber 47 as necessary for providing heat as called for by the computer. The incoming air from the chambers 47 and 48 combines in the chamber 49 and serves to maintain the building atmosphere within the desired parameters under normal conditions.

While the present invention is particularly adapted to rapid evacuating of atmosphere from a localized area within the building wherein abnormal amounts of pollutants are periodically produced by a manufacturing process, it can be employed at any time to supplement the system as it normally operates to quickly alleviate any unsatisfactory hygienic condition. For example, if an undesirably high level of a noxious gas is detected, the dump mode sequence can be initiated to quickly extract the contaminated air rather than allowing it to be displaced by normal operation of the system.

Reviewing briefly operation of the invention, as was previously explained, maintenance of a slightly positive pressure throughout the building interior is important for proper operation of the system. Thus, if a deviation from the desired pressure is observed by a particular one of the pressure sensors 25, or if a trend away from a desired pressure level is noted on successive observations, the computer 24 will adjust the dampers 39 and 43 of the appropriate air handling unit or units 23 to increase the proportion of incoming outside air and building return air to correct the pressure in the area. Due to the pressure differential between the inside and the outside of the building, there is exfiltration from the building through openings in the walls and at doors and windows. There is thus a natural migration of the air from the air handling unit outlets and the interior areas of the building toward the periphery of the building. When the central computer 24 notes an atmospheric condition at any of the temperature or air quality sensors 26 or 27, respectively, falling outside or having a trend to fall outside the predetermined parameters, it will initiate corrective measures as by resetting appropriate ones of the dampers 39, 40 and 43 and controlling operation of the burner 50 of the appropriate one or ones of the air handling units 23. In addition, the computer may adjust the appropriate one or ones of the perimeter relief dampers 28 to regulate exfiltration through the dampers and cause controlled migration of atmosphere toward the relief dampers. The system is thus able to maintain the atmosphere throughout the building within prescribed parameters in the normal operating mode. While in the normal operating mode the damper 45 of the outlet 44 of each air handling unit 23 will be in the full open position, while the adjustable damper 41 of the exhaust outlet 38 will be in the fully closed position.

In the event a buildup of an undesirable pollutant is detected by the central computer 24, it will initiate a sequence of steps for placing the system in dump mode. For example, a monitoring device 29 may observe a buildup of airborne particulates or haze in a certain area as around a production process which occasionally emits abnormally high amounts of such particulates or smoke. Likewise, an air quality sensor 27 may detect a buildup of an invisible noxious gas such as carbon monoxide or the like which needs to be quickly evacuated. The computer 24 will respond accordingly to initiate the dump mode sequence for the appropriate air handling unit or units 23. The pressure throughout the building should remain positive during operation of air handling units in the dump mode configuration to cause the polluted atmosphere to remain in and be extracted from a localized area.

To that end, there is preferably an air quality sensor 27 and a monitoring device 29 below and in the vicinity of each air handling unit 23. In order for the building interior to remain under a positive pressure at all times it is, of course, necessary for a building utilizing the invention to employ two or more air handling units 23. Likewise, generally only one, or a small minority of the total number of air handling units in an area of a building may be operated in the dump mode at any one time so that others of the air handling units can supply additional outside air to compensate for the unit or units operating in the dump mode.

When a buildup of a noxious gas or airborne particulates as would be emitted by a production process in a particular area is noted, the central computer will initiate a sequence of stops, or a command, to place the nearest or appropriate one of the air handling units in the dump mode. By way of example, in a large building employing sixteen air handling units 23, a maximum of two of the units may be enabled to enter the dump mode at one time. The system is further limited in that should the average building pressure, that is, the average of the pressure observed at all of the pressure sensors 25, fall below a predetermined level, dump mode will be cancelled.

Upon issuance of a command for dump mode at an air handling unit 23 by the central computer, the outside air damper 39 will be closed completely and the building return air damper 43 will open fully. After assuring that the damper 39 is closed, as by an appropriate time delay or activation of a limit switch (not shown), the damper 41 in the exhaust outlet 38 is opened. The burner 50, if operating, is shut off and the damper 40 in the burner outside air inlet 30 is closed. Finally, when opening of the damper 41 has been verified, the damper 45 in the building air outlet is closed. Thus, the dampers at the fan shroud 52 will be positioned as illustrated in FIG. 5, the dampers 39 and 40 will be fully closed and the damper 43 fully open, and the air handling unit will be in the dump mode. The perimeter relief dampers 28 in the vicinity of the unit 23 in the dump mode may also be closed to insure that the polluted air in the area is drawn through the air handling unit. As the unit or units 23 enter the dump mode, the outside air inlet dampers 43 on the other air handling units are instructed by the central computer to open further in anticipation of a pressure drop within the building. Such a drop below the set point pressure will cause cancellation of the dump mode procedure. For example, each damper 43 may be immediately opened by a fixed amount, say ten percent, to compensate for the air handling unit or units shifted to dump mode, thus preventing a sudden decrease in pressure below the set point from immediately cancelling the shift to the dump mode.

As will be apparent, the air handling unit in its dump mode configuration thus extracts the polluted atmosphere directly from the local area and discharges it outside the building. The extracted air is replaced by fresh air admitted by the other air handling units.

After the sensors or monitoring devices signal the central computer that the atmosphere is again within the predetermined quality parameters, or after a set time period has passed for extraction of the polluted atmosphere as the case may be, the computer initiates a sequence of stops returning the system to the normal operating mode. Thus, the damper 45 is first opened and, after its opening is verified, the damper 41 is closed. If the unit is to be in the heating mode the burner damper 40 is then opened and the burner 50 is ignited. After a time delay to insure operation of the burner, the outside air damper 39 is appropriately opened and the building return air damper 43 correspondingly closed, and the system is again in normal operation.

While operation of the invention has been described in connection with automatic initiation of the dump mode command by the central computer 24 in response to appropriate signals from the sensors 27 or the monitoring devices 29, it is contemplated that provision may optionally be included for manual initiation of the dump mode operation. Thus, one or more switches (not shown) may be conveniently located in the work area or elsewhere as appropriate for manual activation in emergency situations to initiate the dump mode sequence.

It is to be understood that the form of the invention herewith shown and described is to be taken as an illustrative embodiment only of the same, and that various changes in the shape, size and arrangement of parts, as well as various procedural changes, may be resorted without departing from the spirit of the invention.

What is claimed is:

1. A method of maintaining atmospheric conditions within desired parameters throughout an enclosed building having a localized area in which airborne contaminants are periodically generated, comprising admitting outside air to the building interior at a plurality of first locations, at least one of said first locations being adjacent said localized area, controlling the admission of outside air at said first locations to maintain the atmospheric pressure throughout the interior of said enclosed building above the atmospheric pressure outside said building, periodically determining a selected atmospheric condition within said localized area, the step of periodically determining a selected atmospheric condition including detecting the level of visible airborne pollutants by emitting a high frequency radio signal within said localized area and utilizing the portion of said signal reflected by the airborne pollutants for determining the level of visible airborne pollutants, comparing the determined atmospheric condition with a predetermined desired condition for said localized area, discontinuing admission of conditioned air and exhausting atmosphere from the building interior at said one of said first locations in response to a noted deviation of said atmospheric condition from said desired condition, and increasing the admission of outside air to the building interior at at least one other of said first locations to maintain the atmospheric pressure in said localized area above the atmospheric pressure outside said building, an air handling unit being positioned at each said first location, said air handling unit at said at least one of said first locations comprising a dump mode unit, each said air handling unit including a first inlet port for controllably admitting outside air, a second inlet port for controllably admitting return air from the building interior, and a third outlet port through which air is selectively and controllably admitted to the interior of the building, said dump mode air handling unit further including a fourth outlet port through which air withdrawn from the building interior through said second port is selectively discharged from the building interior, including, in response to the noted deviation, the sequential steps of closing said first inlet port of said dump mode air handling unit, opening said second inlet port, opening said fourth outlet port, and closing said third outlet port whereby airborne contaminants are withdrawn from said localized area through said second port and discharged from said enclosed building through said fourth port.

2. A method of maintaining atmospheric conditions within an enclosed building as claimed in claim 1, including the step of increasing the flow of outside air through said first inlet port of at least one other of said air handling units substantially simultaneously with said closing of said first inlet port of said dump mode air handling unit.

3. A method of maintaining atmospheric conditions within an enclosed building as claimed in claim 2, including increasing the flow of outside air through said first inlet port through a plurality of the other of said air handling units.

4. A system for maintaining atmospheric conditions within desired parameters throughout an enclosed building housing within a localized area thereof an operation which periodically generates airborne contaminants comprising, a plurality of air handling units distributed about said building, each said air handling unit being adapted to openly admit air in controlled amounts directly to said enclosed building, a plurality of pressure sensing means positioned at selected locations about said building for generating a signal indicative of the observed atmospheric pressure within said building at each said location relative to the desired atmospheric pressure, a central computer for receiving said signals and generating second signals indicative of deviations of said observed atmospheric pressure within said building at said locations relative to the outside atmospheric pressure and adjusting the output of air from appropriate ones of said air handling units in response to said second signals to maintain the atmospheric pressure throughout said enclosed building at a desired level above that of said external atmosphere, at least one of said air handling units adjacent said localized area including exhaust means for withdrawing atmosphere from said localized area and discharging it outside said building, first atmospheric sensor means for determining a selected atmospheric condition within said localized area and generating a third signal indicative of said atmospheric condition to said central computer, said first atmospheric sensor means determining the level of airborne particulate within said localized area and comprising means emitting high frequency waves and detecting means generating said third signal in response to waves reflected by particulate in the atmosphere, said central computer being adapted to compare said third signal to stored data representing the desired said atmospheric condition within said localized area and generate fourth signals indicative of deviations of said selected atmospheric condition from said desired atmospheric condition for activating said exhaust means, adjustable relief dampers spaced around the perimeter of said building for selectively permitting exfiltration of atmosphere from said enclosed building, a plurality of second atmosphere sensor means disposed at selected locations within said building for determining selected atmospheric conditions at said selected locations and generating a signal indicative of the observed selected atmospheric condition at each said location, said central computer being adapted to compare said signals to stored data representing the desired atmospheric condition at each said location, and adjust appropriate ones of said relief dampers and the output of air from appropriate ones of said air handling units in response to deviations from the desired atmospheric conditions to thereby maintain said selected atmospheric condition within a desired parameter.

5. A system for maintaining atmospheric conditions within desired parameters throughout an enclosed building housing within a localized area thereof an operation which periodically generates airborne contaminants comprising, a plurality of air handling units distributed about said building, each said air handling unit being adapted to openly admit air in controlled amounts directly to said enclosed building, a plurality of pressure sensing means positioned at selected locations about said building for generating a signal indicative of the observed atmospheric pressure within said building at each said location relative to the desired atmospheric pressure, a central computer for receiving said signals and generating second signals indicative of deviations of said observed atmospheric pressure within said building at said locations relative to the outside atmospheric pressure and adjusting the output of air from appropriate ones of said air handling units in response to said second signals to maintain the atmospheric pressure throughout said enclosed building at a desired level above that of said external atmosphere, at least one of said air handling units adjacent said localized area including exhaust means for withdrawing atmosphere from said localized area and discharging it outside said building, first atmospheric sensor means for determining a selected atmospheric condition within said localized area and generating a third signal indicative of said atmospheric condition to said central computer, said first atmospheric sensor means determining the level of airborne particulate within said localized area and comprising means emitting high frequency waves and detecting means generating said third signal in response to waves reflected by particulate in the atmosphere, said central computer being adapted to compare said third signal to stored data representing the desired said atmospheric condition within said localized area and generate fourth signals indicative of deviations of said selected atmospheric condition from said desired atmospheric condition for activating said exhaust means, each said air handling unit including means drawing in outside ambient air, means drawing in return air from said enclosed building, means combining said ambient outside air and said building return air to provide said air for admission to said enclosed building, and means for varying the proportions of said outside air and building return air admitted to said enclosed building, said at least one air handling unit including means selectively discharging return air drawn from said localized area of said enclosed building through said exhaust means.

6. A system for maintaining atmospheric conditions within desired parameters throughout an enclosed building as claimed in claim 5, wherein said at least one air handling unit includes a first adjustable damper through which said outside air passes, a second adjustable damper through which said building return air passes, a third adjustable damper through which said air admitted to said building passes, and a fourth adjustable damper through which said air discharged through said exhaust means passes.

7. A system for maintaining atmospheric conditions within desired parameters throughout an enclosed building as claimed in claim 6, including means operable to close said first and third dampers and open said second and fourth dampers in response to said fourth signal from said central computer.

8. A system for maintaining atmospheric conditions within desired parameters throughout an enclosed building as claimed in claim 7, including adjustable relief dampers spaced around the perimeter of said building for selectively permitting exfiltration of atmosphere from said enclosed building, and means operable to close at least one of said relief dampers in response to said fourth signal from said central computer.

* * * * *